United States Patent [19]

Kleimann et al.

[11] 4,189,542
[45] Feb. 19, 1980

[54] PROCESS FOR THE PRODUCTION OF FOAM MOLDINGS HAVING AN IMPERVIOUS OUTER SKIN USING SEMI-PREPOLYMER PREPARED FROM ISOCYANATES SUCH AS ISOPHORONE DIISOCYANATE

[75] Inventors: Helmut Kleimann, Leverkusen; Holger Meyborg, Odenthal-Gloebusch; Hans-Jürgen Lienert, Cologne; Gerhard Grögler, Leverkusen, all of Fed. Rep. of Germany

[73] Assignee: Bayer Aktiengesellschaft, Leverkusen, Fed. Rep. of Germany

[21] Appl. No.: 930,303

[22] Filed: Aug. 2, 1978

[30] Foreign Application Priority Data

Aug. 20, 1977 [DE] Fed. Rep. of Germany ....... 2737670

[51] Int. Cl.$^2$ .............................................. C08G 18/14
[52] U.S. Cl. ................................... 521/124; 264/45.5; 521/51; 521/126; 521/127; 521/129; 521/159
[58] Field of Search ................ 521/51, 159, 124, 126, 521/127, 129; 264/45.5

[56] References Cited

U.S. PATENT DOCUMENTS 4,058,492  11/1977  Bonin et al. ...................... 264/45.5
4,116,893   9/1978  Flanagan .......................... 521/159

FOREIGN PATENT DOCUMENTS 969114  9/1964  United Kingdom .................... 264/45.5

*Primary Examiner*—Maurice J. Welsh
*Attorney, Agent, or Firm*—Gene Harsh; Joseph C. Gil; R. Brent Olson

[57] ABSTRACT

The instant invention is directed to a process for the production of weather-resistant rigid molded foams based on polyurethanes having a dimensional stability under heat according to DIN 53 432 of at least 70° C. and a compact surface, a cellular core and an integral density distribution throughout the cross-section of the moldings, comprising foaming a foamable reaction mixture of polyisocyanates, polyhydroxyl compounds, blowing agents and, optionally, other isocyanate-reactive compounds, activators and other auxiliaries in a closed mold under the conditions of in-mold foaming, the improvement wherein the polyisocyanates used are reaction products containing isocyanate groups and urethane groups, said reaction products formed by reacting diisocyanates containing at least one cycloaliphatically bound isocyanate group and no more than one aliphatically bound isocyanate group with sub-stoichiometric quantities of organic polyhydroxyl compounds.

15 Claims, No Drawings

PROCESS FOR THE PRODUCTION OF FOAM MOLDINGS HAVING AN IMPERVIOUS OUTER SKIN USING SEMI-PREPOLYMER PREPARED FROM ISOCYANATES SUCH AS ISOPHORONE DIISOCYANATE

BACKGROUND OF THE INVENTION

This invention relates to a new process for the production of weather-resistant molded foams having high dimensional stability under heat.

Foams based on polyisocyanates, for example polyurethane foams having an impervious outer skin and a cellular core, of the type obtained by the in-mold foaming technique described in German Auslegeschrifts Nos. 1,196,864 and 1,694,138 and French Pat. No. 1,559,325 are particularly suitable for the mass production of lightweight constructions. These foams may be used in furniture, motor vehicles, home construction and elastic moldings, such as cushions, shock absorbers and shoe soles.

The polyurethane moldings are produced by introducing the foamable reaction mixture, which generally contains polyisocyanates, compounds containing at least two isocyanate-reactive hydrogen atoms and additives, into closed, temperature molds in which it foams and hardens. The plastics material completely fills the mold and accurately reproduces the inner surfaces thereof.

The starting materials previously available on the market and the processes previously applied in practice for the production of rigid polyurethane foams are based on the crosslinking of aromatic polyisocyanates with polyether or polyester polyols. Moldings such as these have a high level of mechanical properties, such as E-modulus, thermal stability under load and impact strength, which makes them suitable for numerous applications, such as furniture components, industrial housings and window profiles. One disadvantage common to all of these moldings is that they turn yellow in color as a result of weathering and undergo surface roughening through chemical degradation. As a result, the moldings generally must be coated with a protective lacquer in order to meet more stringent requirements.

It is known that polyurethanes, and particularly polyurethane lacquers, based on aliphatic or alicyclic isocyanates do not have the above-noted tendency towards yellowing. The use of aliphatic or cycloaliphatic polyisocyanates for the production of molded polyurethane foams, and particularly rigid polyurethane foams, with an integral density distribution has generally been avoided since the resultant rigid molded foam is characterized by inadequate mechanical properties. In particular, the dimensional stability of rigid molded foams under heat tested in accordance with DIN 53 432 (based on the classical aliphatic polyisocyanates, such as for example hexamethylene diisocyanate or the biuret polyisocyanate corresponding to this diisocyanate) did not satisfy the requirements of practical application in this respect.

Accordingly, an object of the present invention is to provide a new process by which it is possible to produce rigid molded foams based on polyurethanes which are not attended by the disadvantage of inadequate weather resistance and which show in particular high dimensional stability under heat in addition to a high E-modulus and high impact strength.

According to the invention, this object may be achieved by using certain, selected polyisocyanates in the production of the polyurethane foams.

DESCRIPTION OF THE INVENTION

The present invention is directed to a process for the production of weather-resistant rigid molded foams based on polyurethanes having a dimensional stability under heat tested in accordance with DIN 53 432 of at least 70° C. and a compact surface, a cellular core and an integral density distribution which means an increasing density from the core to the surface, throughout the cross-section of the moldings, by foaming a foamable reaction mixture of polyisocyanates, polyhydroxyl compounds, blowing agents and, optionally, other isocyanate-reactive compounds, activators and other auxiliaries in a closed mold under in-mold foaming conditions characterized in that the polyisocyanates used are reaction products containing isocyanate groups and urethane groups. The reaction products are formed by reacting diisocyanates containing at least one cycloaliphatically bound isocyanate group and no more than one aliphatically bound isocyanate group, with sub-stoichiometric quantities of organic polyhydroxyl compounds.

The invention also relates to the molded foams which can be obtained by this process.

The polyisocyanate component used in the process of the invention consists of solutions of polyisocyanates containing urethane groups based on selected diisocyanates in excess quantities of these diisocyanates, so-called "semi-prepolymers". These semi-prepolymers generally have an average isocyanate content of from 10 to 35% by weight, preferably from 24 to 32% by weight, and a viscosity of from 80 to 5000, preferably from 100 to 2500 mPa.s/25° C. They are produced by reacting (a) any organic diisocyanates having a molecular weight of from 166 to 300 and containing at least one cycloaliphatically bound isocyanate group and no more than one aliphatically bound isocyanate group with (b) any polyhydroxyl compounds, preferably containing aliphatically bound alcoholic hydroxyl groups of the type which are generally known and/or used in polyurethane chemistry in a molar NCO/OH-ratio of from 2:1 to 100:1, and preferably from 4:1 to 16:1. The type and quantities of the starting materials used for producing the semi-prepolymers are selected within the context of the above disclosures in such a way that the viscosity and the isocyanate-content of the semi-preopolymers lie within the ranges specified above.

Diisocyanates suitable for the production of the semi-prepolymers used in the process include, for example: 1,4-diisocyanatocyclohxane; 2,4-diisocyanatoperhydrotoluene; 4,4'-diisocyanatodicyclohexyl methane; 1-isocyanato-3,3,5-trimethyl-5-isocyanatomethyl cyclohexane (isophorone diisocyanate=IPDI); and the like. Isophorone diisocyanate is particularly preferred. Mixtures of different diisocyanates corresponding to the above definitions may also be used in the production of the semi-prepolymers. It is also possible to use semi-prepolymers of the type produced using a diisocyanate, for example IPDI, and subsequently blended with another diisocyanate, for example 4,4'-diisocyanatodicyclohexyl methane, the molar NCO/OH-ratio, based on the total quantity of diisocyanates, lying within the ranges specified above.

Polyhydroxyl compounds useful in the instant invention for production of the semi-prepolymers include any organic compound containing at least two hydroxyl groups and having molecular weights in the range from 62 to 10,000. These reactants for the polyisocyanate components are preferably organic polyhydroxyl compounds containing aliphatically bound hydroxyl groups or mixtures of these polyhydroxyl compounds having an average molecular weight of, preferably, from 150 to 4000. Individual components of any mixture which may be used may have a molecular weight below or above this preferred range, but will still have a molecular weight within the wide range of 62 to 10,000 mentioned above. The hydroxyl compounds preferably used, generally have an average hydroxyl functionality of from 2 to 8, and preferably from 2 to 5. It is particularly preferred to use the corresponding polyhydroxy polyethers and polyhydroxy polyesters, optionally in admixture with simple aliphatic polyols.

It is also, of course, possible to use polythioethers, polyacetals, polycarbonates or polyester amides containing hydroxyl groups and having molecular weights within the ranges mentioned above.

The polyesters containing hydroxyl groups which may be used include, for example, reaction products of polyhydric, preferably dihydric, alcohols (which may contain trihydric alcohols) with polybasic, and preferably dibasic carboxylic acids. Instead of using the free polycarboxylic acids, it is also possible to use the corresponding polycarboxylic acid anhydrides or corresponding polycarboxylic acid esters of lower alcohols, or mixtures thereof, for producing the polyesters. The polycarboxylic acids may be aliphatic, cycloaliphatic, aromatic and/or heterocyclic. They may be substituted, for example by halogen atoms, and/or they may be unsaturated. Examples of suitable polycarboxylic acids include succinic acid, adipic acid, suberic acid, azelaic acid, sebacic acid, phthalic acid, isophthalic acid, trimellitic acid, phthalic acid anhydride, tetrachlorophthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, which may be in admixture with monomeric fatty acids, terephthalic acid dimethyl ester, terephthalic acid-bis-glycol ester. Suitable polyhydric alcohols include, for example, ethylene glycol, 1,2-propylene glycol and 1,3-propylene glycol, 1,4-butylene glycol and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylol propane, 1,2,6-hexane triol, 1,2,4-butane triol, trimethylol ethane, pentaerythritol, guinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The above mentioned low molecular weight polyhydric alcohols may also be used as such.

The polyethers containing at least 2, generally 2 to 8, and preferably 2 to 5 and most preferably 2 to 3 hydroxyl groups which are preferably used in accordance with the invention are known. They may be obtained, for example, by polymerizing epoxides, such as ethylene oxide, propylene oxide, butylene oxide, tetrahydrofuran, styrene oxide or epichlorhydrin on their own, for example in the presence of boron trifluoride, or by adding these epoxides, either in admixture or successively, with starter components containing reactive hydrogen atoms. Examples of starter components include water, alcohols or amines; such as ethylene glycol, 1,3- or 1,2-propylene glycol, trimethylol propane, 4,4'-dihydroxy diphenyl propane, aniline, ammonia, ethanolamine, ethylene diamine and the like. Sucrose polyethers of the type described in German Auslegeschrifts Nos. 1,176,358 and 1,064,938 may also be used. In many cases, it is preferred to use polyethers containing predominant amounts of primary hydroxyl groups (up to 90% by weight, based on all the hydroxyl groups present in the polyether). Polyethers modified by vinyl polymers of the type obtained by polymerizing styrene, and/or acrylonitrile in the presence of polyethers as described in U.S. Pat. Nos. 3,383,351; 3,304,273; 3,523,093 and 3,110,695 and German Pat. No. 1,152,536 are also suitable, as are polybutadienes containing hydroxyl groups.

Among the polythioethers, the condensation products of thiodiglycol on its own and/or with other glycols, dicarboxylic acids, formaldehyde, aminocarboxylic acids or amino alcohols are preferred. Depending upon the co-components, the products in question are polythio mixed ethers, polythioether esters and polythioether ester amides.

Suitable polyacetals include the compounds obtainable from glycols, such as diethylene glycol, triethylene glycol, 4,4'-dioxethoxy diphenyl dimethyl methane, hexane diol and formaldehyde. Polyacetals suitable for use may also be obtained by polymerizing cyclic acetals.

Suitable polycarbonates containing hydroxyl groups are those known per se which may be obtained, for example, by reacting diols, such as 1,3-propane diol, 1,4-butane diol and/or 1,6-hexane diol, diethylene glycol, triethylene glycol, tetraethylene glycol, with diaryl carbonates, for example diphenyl carbonate, or phosgene.

The polyester amides and polyamides include, for example, the predominantly linear condensates obtained from polybasic saturated and unsaturated carboxylic acids or their anhydrides and polyhydric saturated and unsaturated amino alcohols and their mixtures.

Polyhydroxyl compounds already containing urethane or urea groups and natural polyols which may be modified, such as castor oil, carbohydrates and starch, may also be used. Addition products of alkylene oxides with phenolformaldehyde resins or even with urea-formaldehyde resins may also be used.

Representatives of the many hydroxyl group containing compounds which may be used in accordance with the invention are known and are described, for example, in High Polymers, Vol. XVI, "Polyurethanes, Chemistry and Technology", by Saunders-Frisch, Interscience Publishers, New York/London, Vol. I, 1962, pages 32 to 42 and pages 44 to 54, and Vol. II, 1964, pages 5 to 6 and 198 to 199, and in Kunststoff-Handbuch, Vol. VII, Vieweg-Hochtlen, Carl-Hanser-Verlag, Munich, 1966, pages 45 to 71.

Starting materials for producing the semi-prepolymers are preferably the polyhydroxy polyethers and/or polyhydroxy polyesters.

The above-described polyhydroxyl compounds as well as other known active hydrogen containing compounds are used also in producing the moldings of the instant invention.

According to the invention, readily volatile organic substances are used as blowing agents. Suitable organic blowing agents include acetone; ethylacetate; halogen-substituted alkanes, such as methylene chloride, chloroform, ethylidene chlorides, vinylidene chloride, monofluorotrichloromethane, chlorodifluoromethane, dichlorodifluoromethane, trichlorotrifluoroethane; butane; hexane; heptane; or diethyl ethers. A blowing effect can also be obtained by adding compounds which decompose at temperatures above room temperature giving off gases, such as nitrogen. An example would be an azo compound such as azoisobutyronitrile. The volatile organic blowing agents are preferred.

Other examples of blowing agents and information on the use of blowing agents are known and may be found in Kunststoff-Handbuch, Vol. VII, by Vieweg-Hochtlen, Carl-Hanser-Verlag, Munich 1966, pages 108 and 109, 453 to 455 and 507 to 510.

In principle, water may also be used as a blowing agent, although the process of the invention is preferably carried out in the absence of added water.

Catalysts which accelerate the isocyanate addition reaction are generally used in the process. These catalysts are generally added to the polyhydroxyl compounds representing the reactant for the semi-prepolymers in a quantity of from 0.001 to 10% by weight and preferably in a quantity of from 0.2 to 2.0% by weight, based on the polyhydroxyl compounds.

Suitable catalysts include tertiary amines, such as triethylamine, tributylamine, N-methyl morpholine, N-ethyl morpholine, N-cocomorpholine, N,N,N'-tetramethylethylene diamine, 1,4-diazabicyclo-(2,2,2)-octane, N-methyl-N'-dimethylaminoethyl piperazine, N,N-dimethyl benzylamine, bis-(N,N-diethylaminoethyl)-adipate, N,N-dimethyl cyclohexylamine, N,N,N'-N'-tetramethyl-1,3-butane diamine, N,N-dimethyl-β-phenylethylamine, 1,2-dimethyl imidazole and 2-methyl imidazole. Tertiary amines containing isocyanate-reactive hydrogen atoms such as triethanolamine, triisopropanolamine, N-methyl diethanolamine, N-ethyl diethanolamine, N,N-dimethyl ethanolamine, and their reaction products with alkylene oxides, such as propylene oxide and/or ethylene oxide, are also suitable. Other suitable catalysts include sila-amines with carbon-silicon bonds of the type described, for example, in German Pat. No. 1,229,290. Specific examples include 2,2,4-trimethyl-2-silamorpholine and 1,3-diethylaminoethyl tetramethyl disoloxane.

It is also possible to use organometallic compounds, and particularly organo tin compounds, such as for example tin(II)salts of carboxylic acid, such as tin(II)acetate, tin(II)octoate, tin(II)ethyl hexoate and tin(II)laurate; and the dialkyl tin salts of carboxylic acids such as dibutyl tin diacetate.

Other suitable catalysts include nitrogen-containing bases, such as tetraalkyl ammonium hydroxides such as N,N,N-trimethyl-2-hydroxyethyl ammonium hydroxide; alkali hydroxides such as sodium hydroxide or potassium hydroxide; alkali phenolates such as sodium phenolate or potassium phenolate; alkali alcoholates such as potassium tert.-butylate, potassium methylate, sodium ethylate or sodium tert.-butylate.

Other suitable catalysts include, in particular combinations of any organic compounds containing amidine groups or imidazole groups with organometallic compounds of the type noted above. Where combinations such as these are used, both catalysts are added to and mixed with the polyol component or are even used in the form of complexes of the type described in German Offenlegungsschrift No. 2,434,185.

The preferred amidine catalysts include compounds corresponding to the formula:

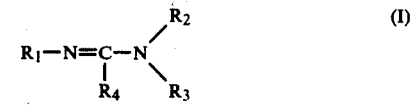

in which

R$_1$, R$_2$ and R$_3$, which may be the same or different, represent hydrogen, an aliphatic hydrocarbon radical containing from 1 to 18 carbon atoms, preferably from 1 to 4 carbon atoms, an aromatic hydrocarbon radical containing from 6 to 10 carbon atoms, preferably a phenyl radical, an araliphatic hydrocarbon radical containing from 7 to 10 carbon atoms, preferably a benzyl radical, or a cycloaliphatic hydrocarbon radical containing from 5 to 7 carbon atoms, preferably a cyclohexyl radical, and R$_4$ is defined as R$_1$, R$_2$ and R$_3$ are defined or R$_4$ represents the group -N(R$_2$)R$_3$.

Examples of amidines such as these include N,N'-dimethyl formamidine, N,N'-dimethyl acetamidine, trimethyl acetamidine, N,N'-dimethyl formamidine, N-benzyl-N,N'-dimethyl acetamidine, N,N'-dimethyl-N-ethyl benzamidine, N,N'-dicyclohexyl-N-methyl acetamidine, triphenyl benzamidine, N,N'-diphenyl-N'-methyl benzyl amidine, tetramethyl guanidine, N,N'-diphenyl-N,N'-dimethyl guanidine, tetraphenyl guanidine, and the like.

The production of amidines such as these is known and is described comprehensively with general working procedures and specific examples in Houben-Miller-Weyl, Methoden der Organischen Chemie, Vol. XI, 2, pages 38 to 66, Verlag G. Thieme, Stuttgart 1958.

Other preferred amidine catalysts which may be used in combination with the metal catalysts are those corresponding to the formula

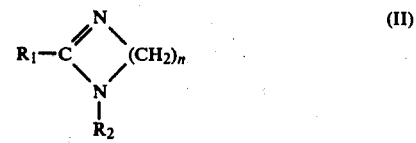

in which

R$_1$ and R$_2$ are as defined above and n is an integer from 2 to 4.

Examples of monocyclic amidines such as these include: 2,3-dimethyl-3,4,5,6-tetrahydropyrimidine, N-methyl-Δ2-tetrahydropyrimidine, N-cyclohexyl-2-methyl-Δ2-tetrahydropyrimidine, N-benzyl-2-butyl-Δ2-tetrahydropyrimidine, 2-methyl-Δ2-imidazoline, 1,2-diphenyl-2-imidazoline, 1-methyl-4-1,2,4-triazoline, 1,5-dibutyl-Δ4-1,2,4-triazoline and the like.

The production of cyclic amidines such as these is known and is also described in Houben-Muller-Weyl, Methoden der Organischen Chemie, Vol. XI, 2, pages 38 to 66.

Other amidine catalysts which are preferably used in combination with the metal catalysts in the process of the invention include those corresponding to the formula

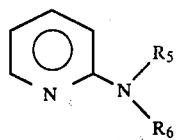

(III)

in which
R$_5$ and R$_6$ which may be the same or different, and represent hydrogen or an alkyl radical containing from 1 to 4 carbon atoms. Examples of amidines such as these include α-aminopyridine, α-dimethylaminopyridine, α-dibutylaminopyridine, and the like, the production of which is described in German Pat. No. 489,184.

Other amidine catalysts preferably used in the process include those corresponding to the formula

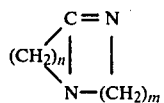

(IV)

in which
n and m which may be the same or different and are integers with values of from 2 to 4. Examples of bicyclic amidines such as these include 1,5-diazabicyclo(4,3,0)-5-nonene, 1,5-diazabicyclo-(4,4,0)-5-decene, 1,8-diazabicyclo-(5,3,0)-decene and the like. The production of bicyclic compounds such as these is described in German Offenlegungsschrift No. 1,545,855.

The amidines may be completely or partly replaced by catalysts containing imidazole groups. Preferred imidazoles include compounds corresponding to the formula

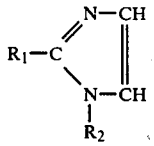

(V)

in which
R$_1$ and R$_2$ are as defined above. Examples of suitable imidazoles include N-methyl imidazole, N-butyl imidazole, 2,3-dimethyl imidazole and the like. The production of imidazole derivatives such as these is described; for example, in v. Answers and Mauss, Ber. dtsch. Chem. Ges. 61, 2415–2418 (1928).

In cases where combinations of amidines or imidazoles and metal catalysts are used, they are preferably used in quantities of from 0.2 to 2.0% by weight, based on the polyol component forming the reactant for the semi-prepolymer.

Other representatives of catalysts which may be used in the invention and information on the way in which these catalysts work are known and may be found in Kunststoff-Handbuch, Vol. VII, by Vieweg and Hochtlen, Carl Hanser Verlag, Munich 1966, pages 96 to 102.

One of the advantages of the process of the invention is that molded foams may be produced having a high resistance to yellowing in comparison to conventional molded foams based on aromatic polyisocyanates. Light stabilizers may also be used in the process for further increasing stability to light, particularly where polyhydroxyl compounds containing ether groups are used. Where light stabilizers such as these are used, they are preferably added to the polyol component in quantities of from 0 to 10% by weight, preferably in quantities of from 0.5 to 5% by weight, based on the polyol component. The following are suitable examples of light stabilizers which may be used in the invention:

I. Piperidine derivatives 4-benzoyloxy-, 4-salicyloyloxy-, 4-capryloyloxy-, 4-stearoyloxy-, 4-(β-3,5-di-tert.-butyl-4-hydroxyphenylpropionyloxy)-, 4-(3,5-di-tert.-butyl-4-hydroxybenzoyloxy)-2,2,6,6-tetramethyl piperidine; 4-Benzoyloxy-, 4-salicyloxyloxy-, 4-stearoyloxy- and 4-tert.-butylbenzoyloxy-1,2,2,6,6-pentamethyl piperidine; bis-(2,2,6,6-tetramethyl-4-piperidyl)-sebacate; bis-(2,2,6,6-tetramethyl-4-piperidyl)-suberate; bis-(2,2,6,6-tetramethyl-4-piperidyl)-dodecane dioate; bis-(1,2,2,6,6-pentamethyl-4-piperidyl)-sebacate; 4-capryloyoxyl-1-propyl-2,2,6,6-tetramethyl piperidine; 4-capryloyloxy-1-allyl-2,2,6,6-tetramethyl piperidine; 4-benzoylamido-, 4-acryloylamido- and 4-stearoylamido-2,2,6,6-tetramethyl piperidine; 2,4,6-tris-(2,2,6,6-tetramethyl-4-piperidyloxy)-s-triazine; 2,4,6-tris(1,2,2,6,6-pentamethyl-4-piperidyloxy)-s-triazine; 2,4,6-tris(2,2,6,6-tetramethyl-4-piperidylamino)-s-triazine; 2,2,6,6,6-tetramethyl-4-β-cyanoethoxy piperidine; 1,2,2,6,6-pentamethyl-4-lauroyloxy piperidine; triacetone amine oxime; and the like.

II. Benzophenone derivatives 2,4-dihydroxy-, 2-hydroxy-4-methoxy-, 2-hydroxy-4-octoxy-, 2-hydroxy-4-dodecyloxy-, 2-hydroxy-4-benzyloxy-, 2-hydroxy-4,4'-dimethoxy-, 2,4,4'-trihydroxy-, 2,2'-dihydroxy-4,4'-dimethoxy-, 2,2',4,4'-tetrahydroxy-, 2,2'-dihydroxy-4-methoxy-, 2-hydroxy-2'-carboxy-4-methoxy-, 2,2'-dihydroxy-4-octoxy-, 2,2'-dihydroxy-4-dodecycloxy benzophenone, and the like.

III. Benzotriazole derivatives 2-(2'-hydroxy-5'-methylphenyl)-; 2-(2'-hydroxy-5'-tert.-butylphenyl)-; 2-(2'-hydroxy-5'-tert.-octylphenyl)-, 2-(2'-hydroxy-3'-tert.-butyl-5'-methylphenyl)-, 2-(2'-hydroxy-3'-tert.-butyl-5'-methylphenyl)-5-chloro-, 2-(2'-hydroxy-3',5'-ditert.-butylphenyl), 2-(2'-hydroxy-3',5'-di-tert.-butylphenyl)-5-chloro-; 2-(2'-hydroxy-3',5'-ditert.-amylphenyl)-, 2-(2'-hydroxy-3',5'-di-tert.-amylphenyl)-5-chloro-; 2-(2'-hydroxy-3'-sec.-butyl-5'-tert.-butylphenyl)-; 2-(2'-hydroxy-3'-tert.-butyl-5'-sec.-butylphenyl)-; 2-(2',4'-dihydroxyphenyl)-; 2-(2'-hydroxy-4'-methoxyphenyl)-; 2-(2'-hydroxy-4'-octoxyphenyl); 2-(2'-hydroxy-3'-α-phenylethyl-5'-methylphenyl)-; 2-(2'-hydroxy-3'-α-phenylethyl-5'-methylphenyl)-5-chlorobenzotriazole, and the like.

IV. Oxalanilides 2-ethyl-2'-ethoxy-; 2-ethyl-2'-ethoxy-5'-tert.-butyl-; 2-ethyl-4-tert.-butyl-2'-ethoxy-5'-tert.-butyl-; 2,2'-dimethoxy-; 2,2'-diethoxy-; 4,4'-dimethoxy-; 4,4'-diethoxy-; 2,4'-dimethoxy-; 2,4'-diethoxy-; 2-methoxy-2'-ethoxy-; 2-methoxy-4'-ethoxy-; 2-ethoxy-4'-methoxy-; 2,2'-dioctoxy-5,5'-dioctoxy-; 5,5'-di-tert.-butyl-; 2,2-didodecycloxy-5,5'-di-tert.-butyl-; 2-ethyl-2'-octoxy-; 4,4'-dioctoxy-; 2-ethyl-2'-butoxy-; 4-methyl-4'-methoxy-oxalanilido; and the like.

V. Salicylic acid phenol esters and derivatives salicylic phenyl ester; salicylic acid-4-tert.-butylphenyl ester, salicylic acid-4-tert.-octylphenyl ester and the like.

VI. Cinnamic acid ester derivatives a-cyano-β-methyl-4-methoxy cinnamic acid methyl ester; a-cyano-β-methyl-4-methoxy cinnamic acid butyl ester; a-cyano-β-phenyl cinnamic acid ethyl ester; a-cyano-β-phenyl cinnamic acid isooctyl ester; and the like.

VII. Malonic ester derivatives 4-methoxy-benzylidene malonic acid dimethyl ester; 4-methoxybenzylidene malonic acid diethyl ester; 4-butoxy-benzylidene malonic acid dimethyl ester; and the like.

The above mentioned light stabilizers are preferably used individually, although they may also be used in any combinations. It is particularly preferred to use benzotriazole derivatives, and particularly 2-(2'-hydroxy-3',5'-di-tert.butyl phenyl)-5-chlorobenzotriazole.

Surface-active additives such as emulsifiers and foam stabilizers may also be used. Examples of emulsifiers include the sodium salts of castor oil sulfonates, and fatty acids, or the salts of fatty acids with amines, such as diethylamine/oleic or diethanolamine/stearic acid. Alkali or ammonium salts of sulfonic acids, such as those of dodecyl benzene sulfonic acid or dinaphthyl methane disulfonic acid, or of fatty acids, such as ricinoleic acid, or of polymeric fatty acids may also be used.

Suitable foam stabilizers include water-soluble polyether siloxanes. These compounds generally have a structure in which a copolymer of ethylene oxide and propylene oxide is attached to polydimethyl siloxane radical. Foam stabilizers of this kind are known and are described in U.S. Pat. No. 2,764,565.

It is also possible to use reaction retarders, for example substances with an acid reaction, such as hydrochloric acid or organic acid halides; cell regulators known per se, such as paraffins or fatty alcohols or dimethyl polysiloxanes; pigments or dyes; flameproofing agents known per se, for example tris-chloroethyl phosphate, tricresyl phosphate or ammonium phosphate and polyphosphate; stabilizers against the effects of ageing and weather; plasticizers; substances with fungistatic and bacteriostatic effects; and fillers such as barium sulphate, kieselguhr, carbon black or prepared chalk.

Other examples of useful surface-active additives, foam stabilizers, cell regulators, reaction retarders, stabilizers, flameproofing agents, plasticizers, dyes and fillers, substances with fungistatic and bacteriostatic effects, and also information on the way in which these additives are to be used and how they work, are known and may be found in Kunststoff-Handbuch, Vol. VII, published by Vieweg und Hochtlen, Carl-Hanser-Verlag, Munich, 1966, pages 103 to 113.

External or internal mold release agents known per se may also be used for carrying out the process. "External" mold release agents are in particular waxes or metal soaps, while "internal" mold release agents include the mold release agents described in U.S. Pat. No. 3,726,952, British Pat. No. 1,365,215; German Offenlegungsschriften Nos. 2,356,692; 2,363,452; 2,404,310; 2,427,273 and 2,431,968 and British Pat. No. 1,420,293.

To carry out the process of the invention, the active hydrogen containing compound or compounds which preferably contains all of the auxiliaries and additives mentioned by way of example is generally reacted with the semi-prepolymer, for example by using machines of the type described in U.S. Pat. No. 2,764,565. Information on processing machines which may also be used may be found in Kunststoff-Handbuch, Vol. VI, published by Vieweg und Hochtlen, Carl-Hanser-Verlag, Munich, 1966, pages 121 to 205.

The process is carried out in closed molds. To this end, the reaction mixture is introduced into a mold. Suitable mold materials include metals such as aluminum, or plastics such as epoxide resins. The foamable reaction mixture foams in the mold and forms the molding. In the aplication of the process, the foamable reaction mixture is generally introduced into the mold in the quantity which, with free foaming, would lead to a foam of which the volume is greater than the internal volume of the mold and preferably corresponds to between 120 and 1000% of the volume of the mold. This technique is known as overcharging and is described in U.S. Pat. Nos. 3,178,490 and 3,182,104.

In carrying out the molding process, the reactants are also preferably used in quantities which correspond to an "isocyanate index" of from 90 to 120, preferably from 100 to 110. It is also possible to work with an isocyanate index above 120, for example where trimerization catalysts, such as alkali metal acetates, are simultaneously used for trimerizing the excess isocyanate groups to form isocyanurates. However, this particular embodiment is less preferred. In the context of the invention, the "isocyanate index" is the ratio of the isocyanate groups to all of the groups reactive with isocyanate groups present in the reaction mixture. An isocyanate index of 100 signifies the presence of equivalent quantities of isocyanate groups and isocyanate-reactive groups.

It is possible by the process according to the invention to produce rigid molded foams with an impervious outer skin, a cellular core and an integral density distribution, i.e. a continuous increase in density from the mold core outwards. These foams are characterized by high resistance to weather and outstanding mechanical properties, and in particular a dimensional stability under heat tested according to DIN 53 432 of at least 70° C. and preferably of at least 90° C. The rigidity of the products is primarily determined by the functionality and chain length of the starting materials, i.e. by the degree of branching of these starting materials. Thus, even where slightly branched starting materials are used which have an average isocyanate and hydroxyl functionality of little more than 2.0, it is possible to obtain rigid foams for example by using polyhydroxyl compounds of relatively low molecular weight.

The products obtained may be used for the production of furniture components, bodywork sections of motor vehicles, commercial apparatus and components.

The process is described in the following Examples. An aluminum mold measuring 10×600×1000 mm, the inner walls of which had been pretreated with a silicone-based external release agent (Indrosil 2000 of Indroma Chemikalien. Eschborn, Germany), was used in Examples 1 to 6. With free foaming, foams having a density of from about 70 to 200 g/cc would be formed in Examples 1 to 6.

EXAMPLES

EXAMPLE 1

100 parts by weight of a polyol mixture having a hydroxyl number of 946 and a viscosity at 25° C. of 4300 mPa.s, consisting of (a) 95 parts by weight of a polyether having a hydroxyl number of 900 obtained by adding propylene oxide with trimethylol propane, and (b) 5 parts by weight of ethylene glycol; 3 parts by weight of a commercial polysiloxane-polyalkylene oxide block copolymer (L 5340 of Union Carbide Corp.) as foam stabilizer; 1 part by weight of 1-cyclohexyl-2-methyl tetrahydropyrimidine and 0.5 part by weight of dibutyl tin-(IV)-dilaurate as catalyst combination; and, 10 parts by weight of monofluorotrichloromethane as blowing agent, were combined to form a polyol component.

The polyisocyanate component consisted of 277 parts by weight of a semi-prepolymer obtained by reacting 7.74 mols of a polyether polyol (formed from trimethylol propane and propylene oxide, hydroxyl number 378) and 1.47 mols of a polyester (formed from castor oil and cyclohexanone formaldehyde condensate in a weight ratio of 75:25, hydroxyl number 165) with 121.9 mols of 1-isocyanato-3,3,5-trimethyl-5-isocyanatomethyl cyclohexane (isophorone di-isocyanate). The resultant polyisocyanate had a total isocyanate content of 28.2% and a viscosity of 120 mPa.s/25° C.

The reaction components were mixed by means of a two-component metering mixer and introduced into a closed metal mold tempered to 90° C. in which the mixture foamed and hardened. Reaction times of the foam mixture were: cream time 15 seconds and gel time 30 seconds. After 5 minutes, the molding was removed from the mold. The molding had a total gross density of 0.6 g/cc and a compact skin impervious on all sides. The thickness of the molding was 10 mm.

The molding was weathered for 1000 hours in a Weather-O-Meter test. Thereafter the residual gloss of the test specimens was determined by the Gardner Gloss method (DIN 67 530, gloss angle 60° C.). The residual gloss amounted to 100%. The color difference between the weathered test specimen and the O-specimen, as determined with the grey scale according to DIN 54 001 and SNV 195805, amounted to 4. In other words, the color difference was only minimal. The test specimens had a dimensional stability under heat according to DIN 53 432 of 94° C.

EXAMPLE 2

100 parts by weight of a polyol mixture having an OH-number of 946 and a viscosity at 25° C. of 4300 mPa.s, consisting of (a) 95 parts by weight of a polyether having a hydroxyl number of 900 obtained by adding propylene oxide with trimethylol propane, and (b) 5 parts by weight of ethylene glycol; 3 parts by weight of the polysiloxane-polyalkylene oxide block copolymer of example 1 as foam stabilizer; 1 part by weight of 1-cyclohexyl-2-methyl tetrahydropyrimidine and 0.5 part by weight of dibutyl tin(IV)dilaurate as catalyst combination; 2 parts by weight of 2-(2'-hydroxy-3',5'-di-tert.-butyl-phenyl)-5-chlorobenzotriazole as UV-stabilizer; and 10 parts by weight of monofluorotrichloromethane, were combined to form a polyol component.

The polyisocyanate component consisted of 277 parts by weight of a semi-prepolymer obtained by reacting 7.74 mols of a polyol (formed from trimethylol propane and propylene oxide, hydroxyl number 378) and 1.47 mols of a polyester (formed from castor oil and cyclohexanone formaldehyde condensate in a weight ratio of 75:25, hydroxyl number 165) with 121.9 mols of isophorone diisocyanate. The polyisocyanate had a total isocyanate content of 28.2% and a viscosity of 120 mPa.s/25° C.

As in Example 1, the reaction components were mixed by means of a two component metering mixer and foamed into a molding in a closed metal mold tempered to 90° C. Reaction times were cream time of 15 seconds and gel time of 29 seconds.

The molding was weathered for 1000 hours in a Weather-O-Meter test. Thereafter the residual gloss of the test specimens was determined by the Gardner Gloss method (DIN 67 530, gloss angle 60°). The residual gloss amounted to 100%. The difference in color between the weathered test specimen and the O-test specimen, as determined with the grey scale according to DIN 54 001 and SNV 195805, amounted to 5. In other words, there was no color difference. The test specimens had a dimensional stability under heat according to DIN 53 432 of 94° C.

EXAMPLE 3

100 parts by weight of a polyol mixture having a hydroxyl number of 588 and a viscosity $\theta_{25}$ of 4300 mPa.s, consisting of (a) 35 parts by weight of a polyether having a hydroxyl number of 36 obtained by adding propylene oxide and ethylene oxide in a weight ratio of 80:20 with trimethylol propane, (b) 4 parts by weight of a polyether having a hydroxyl number of 650, obtained by adding propylene oxide with trimethylol propane, and (c) 61 parts by weight of a polyether having a hydroxyl number of 900, obtained by adding propylene oxide with trimethylol propane; 3 parts by weight of the polysiloxane-polyalkylene oxide blocked copolymer of example 1 as foam stabilizer; 0.6 part by weight of 1-cyclohexyl-2-methyl-tetrahydropyrimidine; 0.15 parts by weight of a 1:1-adduct of 1-methyl-2-methyl-tetrahydropyrimidine and dibutyl tin(IV)-dilaurate as activator; and 10 parts by weight of monofluorotrichloromethane as blowing agent, were combined to form a polyol component.

The polyisocyanate component consisted of 168 parts by weight of a semi-prepolymer having an isocyanate content of 29% and a viscosity $\eta_{25}$ of 468 mPa.s, obtained by prepolymerizing isophorone diisocyanate with a polyester [synthesized from adipic acid, phthalic acid anhydride and maleic acid anhydride in a molar ratio of 46:10:1 and 1,2-propane diol and trimethylol propane in a molar ratio of 22:21 (hydroxyl number 285, viscosity $\eta_{75}$=2200 mPa.s)].

As in Example 1, the reaction components were mixed by means of a two component metering mixer and introduced into a closed mold tempered to 90° C. Reaction times were cream time of 14 seconds and gel time of 28 seconds. After 5 minutes, the molding was removed from the mold. The molding had a total gross density of 0.6 g/cc and a compact skin impervious on all sides.

The molding was weathered for 1000 hours in a Weather-O-Meter test. Thereafter, the residual gloss of the test specimens was determined by the Gardner Gloss method (DIN 67 530, gloss angle 60° C.). The residual gloss amounted to 100%. The difference in color between the weathered test specimen and O-test specimen, as measured with the grey scale according to DIN 54 001 and SNV 195805, amounted to 4. In other words there was only a minimal difference in color. The test specimens had a dimensional stability under heat according to DIN 53 432 of 107° C.

EXAMPLE 4 (Comparison Example)

100 parts by weight of a polyol mixture having a hydroxyl number of 946 and a viscosity at 25° C. of 4300 mPa.s, consisting of (a) 95 parts by weight of a polyether having a hydroxyl number of 900 obtained by adding propylene oxide with trimethylol propane, and (b) 5 parts by weight of ethylene glycol; 3 parts by weight of the polysiloxanepolyalkylene oxide block copolymer of example 1 as foam stabilizer; 0.6 part by weight of 1-cyclohexyl-2-methyl tetrahydropyrimidine; 0.5 part by weight of a 1:1 mixture of 1-cyclohexyl-2-methyl tetrahydropyrimidine and dibutyl tin (IV) dilaurate as catalyst; and 10 parts by weight of monofluorotrichloromethane, were combined to form a polyol component.

The polyisocyanate component consisted of 291 parts by weight of a semi-prepolymer having an isocyanate content of 26.5% and a viscosity $\eta_{25}$ of 2200 mPa.s which was formed by biuretizing 1,6-hexamethylene diisocyanate.

As in Example 1, the reaction components were mixed by means of a two component metering mixer and introduced into a closed mold tempered to 90° C. in which the mixture foamed and hardened under compression. Reaction times were cream time of 15 seconds and gel time of 22 seconds. After 5 minutes, the molding was removed from the mold. The molding had a total gross density of 0.6 g/cc and a compact skin impervious on all sides. The molding had a thickness of 10 mm.

The molding was weathered for 1000 hours in a Weather-O-Meter test. Thereafter the residual gloss of the test specimens was determined by the Gardner Gloss method (DIN 67 530, gloss angle 60° C.). The residual gloss amounted to 100%. The difference in color between the weathered test specimen and the O-test specimen, and determined with the grey scale according to DIN 54 001 and SNV 295805, amounted to 3. The test specimens had a dimensional stability under heat according to DIN 53 432 of 67° C.

EXAMPLE 5

100 parts by weight of a polyol mixture having a hydroxyl number of 599 and a viscosity of 2700 mPa.s/25° C., (of which 65% consisted of a polyether having a hydroxyl number of 900 obtained by adding propylene oxide with trimethylol propane, and 35% of a polyether polyol having a hydroxyl number of 42, obtained by propoxylating a mixture of 84% by weight of trimethylol propane and 16% by weight of 1,2-propane diol); 3 parts by weight of the polysiloxanepolyalkylene oxide block copolymer of example 1, as foam stabilizer, 1 part by weight of 1-cyclohexyl-2-methyl tetrahydropyrimidine and 0.5 part by weight of dibutyl tin(IV)dilaurate as catalyst; and 15 parts by weight of monofluorotrichloromethane, were combined to form a polyol component.

The isocyanate component consisted of 164 parts by weight of a semi-prepolymer having an isocyanate content of 30.2% by weight and a viscosity of 230 mPa.s/25° C. which had been obtained by reacting isophorone diisocyanate with substoichiometric quantities of the polyhydroxy polyester of Example 3. The reaction components were mixed by means of a two component metering mixer and introduced into a closed metal mold tempered to 90° C. in which the mixture foamed and hardened under compression. Reaction times of the foam mixture were cream time of 15 seconds, and gel time of 30 seconds. After 5 minutes, the molding was removed from the mold. The molding had a total gross density of 0.6 g/cc and a compact skin impervious on all sides. The molding had a thickness of 10 mm.

The molding was weathered for 1000 hours in a Weather-O-Meter test. Thereafter the residual gloss of the test specimens was determined by the Gardner Gloss method (DIN 67 530, gloss angle 60° C.). The residual gloss amounted to 100%. The difference in color between the weathered test specimen and the O-test specimen, as determined with the grey scale according to DIN 54 001 and SNV 195805, amounted to 4. In other words the color difference was only minimal.

The molding obtained with a density of 0.6 g/cc had a flexural strength according to DIN 53 432 of 40 mPa.s, a deflection according to DIN 53 432 of 13 mm, an E-modulus according to DIN 53 432 of 990 mPa.s, an elongation at break according to DIN 53 432 of 8%, a dimensional stability under heat according to DIN 53 432 of 104° C. and an impact strength according to DIN 53 432 of 16 Joules/m².

EXAMPLE 6

100 parts by weight of a polyol mixture having a hydroxyl number of 620 (consisting of 65 parts by weight of the polyether having a hydroxyl number of 900 described in Example 1 and 35 parts by weight of the polyether having a hydroxyl number of 42 described in Example 5); 3 parts by weight of the polysiloxane-polyalkylene oxide block copolymer of example 1 as foam stabilizer; 0.6 part by weight of 1-cyclohexyl-2-methyl tetrahydropyrimidine and 0.5 part by weight of a 1:1-mixture of 1-cyclohexyl-2-methyl tetrahydropyrimidine and dibutyl tin(IV)dilaurate as catalyst mixture; and 15 parts by weight of monofluorotrichloromethane, were combined to form a polyol component.

The polyisocyanate component consisted of 152 parts by weight of a polyisocyanate mixture consisting of equal parts by weight of the semi-prepolymer mentioned in Example 5 and 4,4'-diisocyanatodicyclohexyl methane.

The reaction components were mixed by means of a two component metering mixer and introduced into a closed metal mold tempered to 70° C. in which the mixture foamed and hardened. The cream time was 15 seconds and the gel time 25 seconds. The molding had a thickness of 10 mm and a gross density of 0.6 g/cc with a compact skin impervious on all sides. Its dimensional stability under heat according to DIN 53 432 amounted to 102° C.

EXAMPLE 7

The suitability of various catalysts for the process according to the invention, particularly with regard to their influence upon cream time, gel time and dimensional stability under heat according to DIN 53 432, was investigated in the following Example.

The standard recipe used consisted of 100 parts by weight of a polyol mixture having a hydroxyl number of 620 (consisting of 35 parts by weight of a polyether having a hydroxyl number of 43, obtained by adding propylene oxide and ethylene oxide with trimethylol propane in a weight ratio of 80:20, and 65 parts by weight of a polyether having a hydroxyl number of 930 obtained by adding propylene oxide with trimethylol propane); 2 parts by weight of the polysiloxane-polyalkylene oxide block copolymer of example 1 as foam stabilizer; 10 parts by weight of monofluorotrichloromethane as blowing agent; and 714 parts by weight of an aliphatic polyisocyanate having an isocyanate content of 29.4% by weight, produced by prepolymerizing 1-isocyanato-3,3,5-trimethyl-5-isocyanatomethyl cyclohexane with the polyester of Example 3.

This standard recipe was foamed in a closed aluminum mold measuring 20×30×1 cm with the quantities indicated in the Table of the catalyst indicated in the Table, the quantity of reaction mixture introduced into the mold being in each case measured in such a way that the densities quoted in the Table were obtained.

Table

| Catalyst | parts by weight | Cream time (Seconds) | Mold temp. (°C.) | Gel time (seconds) | Density (g/cc) | Density with free foaming (g/cc) | Shore D | DSUH* (°C.) |
|---|---|---|---|---|---|---|---|---|
| Dibutyl tin dilaurate | 3.0 | 69 | 70 | 80 | 375 | 140 | 35 | 101 |
| Tin (II)-di-(2-ethylhexoate) | 3.0 | 24 | 70 | 32 | 725 | 140 | 75 | 94 |
| Benzyl trimethyl ammonium hydroxide[1] | 1.5 | 15 | 70 | 35 | 425 | 130 | 48 | 95 |
| Potassium hydroxide | 1.0 | 16 | 70 | 35 | 450 | 120 | 45 | 87 |
| Potassium phenolate[2] | 3.0 | 13 | 70 | 30 | 640 | 175 | 65 | 99 |
| Potassium tert.-butylate[3] | 1.0 | 110 | 70 | 133 | 470 | 175 | 54 | 92 |
| Zinc acetyl acetonate | 3.0 | 18 | 70 | 24 | 530 | 100 | 59 | 89 |

[1]40% solution in methanol
[2]21% solution in ethylene glycol
[3]20% solution in ethylene glycol
*DSUH = dimensional stability under heat, DIN 53432

What is claimed is:

1. In a process for the production of weather-resistant rigid molded foams based on polyurethanes having a dimensional stability under heat according to DIN 53 432 of at least 70° C. and a compact surface, a cellular core and an integral density distribution throughout the cross-section of the moldings, comprising foaming a foamable reaction mixture of polyisocyanates, polyhydroxyl compounds, blowing agents and, optionally, other isocyanate-reactive compounds, activators and other auxiliaries in a closed mold under the conditions of in-mold foaming, the improvement wherein the polyisocyanates used are reaction products containing isocyanate groups and urethane groups, said reaction products formed by reacting a diisocyanate containing at least one cycloaliphatically bound isocyanate group and no more than one aliphatically bound isocyanate group with sub-stoichiometric quantities of organic polyhydroxyl compounds in the presence of catalyst combinations of amidine catalysts and organometallic compounds.

2. The process of claim 1, wherein said polyisocyanates are liquid at room temperature, have an isocyanate content of from 15 to 35% by weight, and are produced by reacting 4,4'-diisocyanatodicyclohexyl methane or 1-isocyanato-3,3,5-trimethyl-5-isocyanatomethyl cyclohexane with substoichiometric quantities of organic polyhydroxyl compounds.

3. The process of claim 1, wherein said polyisocyanate is a reaction product of 1-isocyanato-3,3,5-trimethyl-5-isocyanatomethyl cyclohexane with sub-stoichiometric quantities of organic polyhydroxyl compounds, and wherein said polyisocyanate has an NCO-content of from 24 to 32% by weight and a viscosity of from 100 to 2500

4. The process of claim 1, wherein said polyisocyanates are produced by reacting diisocyanates and polyhydroxyl compounds wherein said diisocyanates have a molecular weight of from 166 to 300 and said polyhydroxyl compounds have an average molecular weight of from 150 to 4,000 and an average hydroxyl functionality of from 2 to 8.

5. The process of claim 4, wherein the NCO/OH ratio of said diisocyanates and polyhydroxyl compounds is 2:1 to 100:1 and the functionality of said polyhydroxyl compounds is 2.1 to 5.

6. The process of claim 5, wherein said NCO/OH ratio is from 4:1 to 16:1.

7. The process of claim 1, wherein said polyisocyanates have an average isocyanate content of from 10 to 35% by weight and a viscosity of from 80 to 5,000 mPa.s/25° C.

8. The process of claim 7 wherein said average isocyanate content is from 24 to 32% by weight and said viscosity is 100 to 2,500 mPa.s/25° C.

9. The product of the process of claim 1.

10. The process of claim 1, wherein said organometallic compounds are organo tin compounds.

11. The process of claim 10, wherein said amidine catalysts are of the formula:

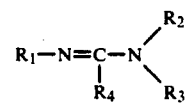

in which
R$_1$, R$_2$ and R$_3$, which may be the same or different, represent hydrogen, an aliphatic hydrocarbon radical containing from 1 to 18 carbon atoms, an aromatic hydrocarbon radical containing from 6 to 10 carbon atoms, an araliphatic hydrocarbon radical containing from 7 to 10 carbon atoms, or a cycloaliphatic hydrocarbon radical containing from 5 to 7 carbon atoms, and
R$_4$ is defined as R$_1$, R$_2$ and R$_3$ are defined or R$_4$ represents the group -N(R$_2$)R$_3$.

12. The process of claim 10, wherein said amidine catalysts are of the formula:

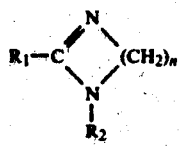

in which

R₁ and R₂ are as defined above, and n is an integer from 2 to 4.

13. The process of claim 10, wherein said amidine catalysts are of the formula:

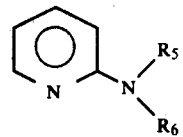

in which $R_5$ and $R_6$ which may be the same or different, and represent hydrogen or an alkyl radical containing from 1 to 4 carbon atoms.

14. The process of claim 10, wherein said amidine catalysts are of the formula:

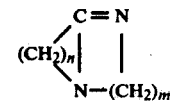

in which n and m which may be the same or different and are integers with values of from 2 to 4.

15. The process of claim 1, wherein said catalyst combinations are used in quantities of 0.2 to 2.0% by weight, based on the quantity of organic polyhydroxyl compounds used to prepare the semi-prepolymer.

* * * * *